J. CICHOCKI.
FEED BAG.
APPLICATION FILED MAR. 5, 1912.
1,097,169.
Patented May 19, 1914.
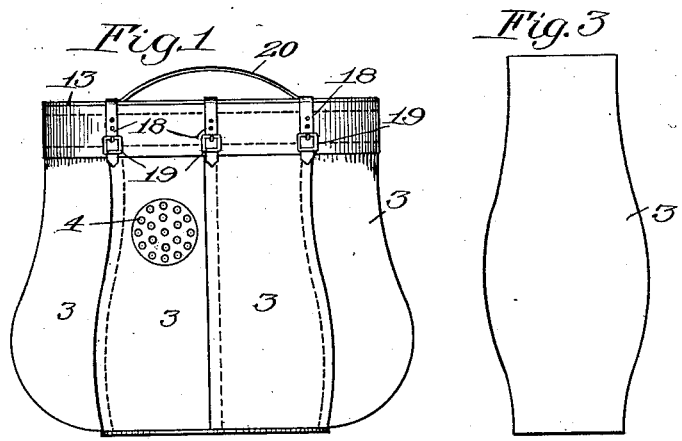
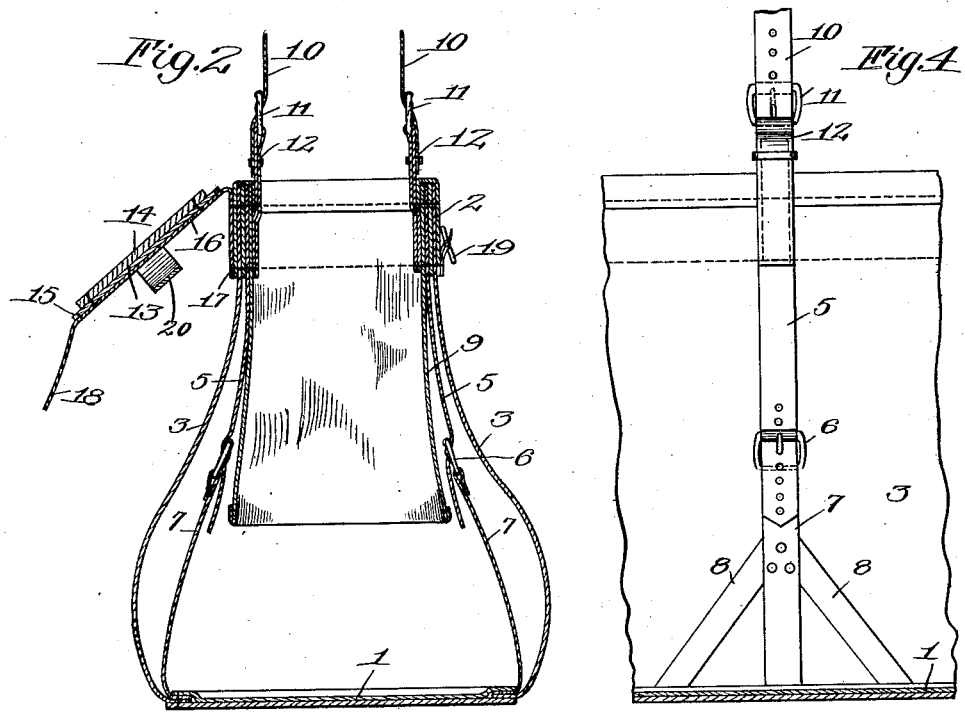
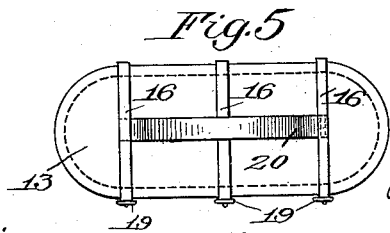
Witnesses
Ada M. Whitmore.
Harvey S. Knight
Inventor
Jacob Cichocki
By J. H. H. Simms
Attorney

UNITED STATES PATENT OFFICE.

JACOB CICHOCKI, OF ROCHESTER, NEW YORK.

FEED-BAG.

1,097,169.

Specification of Letters Patent.  Patented May 19, 1914.

Application filed March 5, 1912. Serial No. 681,687.

*To all whom it may concern:*

Be it known that I, JACOB CICHOCKI, of Rochester, in the county of Monroe and State of New York, have invented a new and useful Improvement in Feed-Bags, which improvement is fully set forth in the following specification and shown in the accompanying drawings.

The present invention relates to animal feeding bags and an object of the same is to provide a bag in which provision is made for accommodating the bag to the head of the animal and the amount of food to be fed to such animal.

A further object is to provide a feed bag having provision for closing the same while, at the same time, not interfering with the conformation of the bag to the head of the animal.

To these and other ends, the invention consists in certain parts and combinations of parts all of which will be hereinafter described, the novel features being pointed out in the appended claims.

In the drawings: Figure 1 is a side view of the bag in closed position; Fig. 2 is a vertical section through the bag in open position; Fig. 3 is a detail view showing one of the adjusting devices; Fig. 4 is a detail view of one of the side sections of the bag; and Fig. 5 is a top view of the bag with the cover closed.

In carrying out the invention, it is preferred to provide a substantially rigid bottom 1, in this instance, in the form of a leather disk covered on its inner face with cloth. There may also be provided a rim or ring 2 forming the mouth of the bag and connected to the bottom by a flexible side wall. The rim is formed of one or more layers of leather or the like so as to provide a stiff yet yieldable mouth to the bag, and has the side wall stitched or otherwise secured thereto. The side wall is preferably formed of a number of sections of canvas 3, the blank of one of said sections being shown in Fig. 4 and being wider at a point near the lower end than throughout the remaining portions of its length thus giving a bulged appearance to the bag and providing greater capacity and air space within the bag. One or more ventilating devices, such as 4, may be provided in the side wall of the bag to admit air to the interior. To the end that the bottom of the bag may be adjusted relatively to the rim 2, in order that the depth of the bag may be made to correspond with the length of the head of the animal and also with the amount of food contained within the bag, there is provided adjustable connections between the rim and the bottom, preferably arranged within the bag so as not to restrict the size of the bag by confining the side walls. In this instance, the adjustable means embodies two adjusting devices arranged within the bag and located on opposite sides of the bottom 1. Each adjustable device consists preferably of a strap or connection 5 laced through a buckle 6 which is secured on the upper end of a strap or connection 7, the strap 5 being secured to the rim 2 and the strap 7 being secured to the bottom 1. Preferably bracing straps 8 are secured to each strap 7 and the bottom 1 in order that the latter may be sustained throughout the greater portion of one side and in this way be prevented from tilting owing also to the fact that its opposite side is likewise supported. In this way, when the bottom is raised, food within the bag will also be elevated but the bag will expand laterally owing to its bulged formation so that the position of the top of the food will not be changed materially.

With the purpose in view of protecting the mouth of the horse from the buckles 6 and, at the same time, to prevent the escape of food when the horse shakes his head, there may be provided a shield or guard comprising, in this instance, a depending open-ended sleeve 9 secured at its upper end to the rim 2. The lower end of the sleeve 9 is arranged below the buckles on the upper end of the strap 7.

The bag may be suspended by means of straps 10 passed in any suitable manner around the head of the horse and detachably secured to the bag by the means of buckles 11 carried by small straps 12 which are in turn secured to the rim 2 on the inner side of the latter so that they may, with the strap 10, be folded within the bag.

Another feature of this invention is a cover consisting, in this instance, of an elongated substantially elliptical sheet of leather 13 and a second piece of sheet material 14 secured to the under side of the sheet 13 in such a manner as to provide a surrounding flange 15. The portion 14 fits within the rim of the bag while the flanged portion 15 rests upon the top portion of said rim.

Preferably the cover is hinged to the bag by means of flexible straps 16, the latter being secured to the rim at 17, extending across the top of the cover and spaced apart and projecting from the opposite side thereof at 18 to coöperate with buckles 19 secured to the rim on the side opposite to that to which the portion 17 of the straps are secured, thus providing, with said buckles, securing devices for the cover. The portions of the straps which form the hinges are not secured to the cover and to the rim in close proximity to the hinged side as it is desirable, to provide hinges which will permit the rim or mouth of the bag to assume various shapes to conform to the head of the horse, while at the same time permitting it to assume an oval shape to conform to the cover. The top of the cover may be provided with a handle or hand grip 20 so that, when the cover is secured in closed position, the bag may be carried by such handle.

The operation of this invention will be understood from the foregoing description but it may be summarized as follows: The bag is first adjusted by lengthening or shortening the adjusting devices 5, 7 to correspond with the amount of food and to the size of the head of the horse. This causes the bag to expand laterally while raising its bottom and supporting the latter against tilting. As the adjusting devices are arranged within the bag the lateral expansion of the latter is not interfered with. The depending sleeve serves the dual function of preventing the escape of the food when the horse shakes his head and covering the buckles of the adjusting devices. The cover serves to retain the food and at the same time may be thrown to such a position that it does not interfere with the use of the bag.

What I claim as my invention and desire to secure by Letters Patent is—

1. A feed bag comprising a substantially rigid bottom, a rim, flexible sides, a sleeve depending within the bag and terminating short of the bottom thereof, the sides of the sleeve being spaced from the sides of the bag and forming a recess therewith, adjustable devices arranged within the bag for supporting the bottom in different positions relative to the mouth of the bag, the adjustable devices being disposed within the recess between the sides of the bag and the sleeve.

2. A feed bag comprising a substantially rigid bottom, a rim, flexible sides, adjustable devices connecting the bottom of the bag with the rim, said adjustable devices comprising straps secured to the rim and straps secured to the bottom with fastening means connecting the free ends of the straps, and a sleeve depending within the bag and extending below the fastening means of the straps.

3. In a feed bag, the combination with a substantially rigid bottom, and a rim, of flexible sides connecting the bottom and the rim and formed from a plurality of vertical sections which bulge near their lower ends, and a pair of adjusting devices connecting the rim with the bottom within the bag, said adjusting devices extending upwardly from opposite sides of the bottom and each comprising a strap secured to the bottom, brace straps connecting said strap with the bottom, and a strap secured to the rim and adapted for connection with the strap on the bottom and an open-ended sleeve depending in the bag and extending below the connecting ends of the straps.

JACOB CICHOCKI.

Witnesses:
 WALTER A. STANLEY,
 H. H. SIMMS.

Copies of this patent may be obtained for five cents each, by addressing the "Commissioner of Patents, Washington, D. C."